United States Patent
Lee et al.

(10) Patent No.: US 10,506,626 B2
(45) Date of Patent: Dec. 10, 2019

(54) METHOD FOR RECEIVING DOWNLINK CONTROL CHANNEL IN WIRELESS COMMUNICATION SYSTEM AND APPARATUS THEREFOR

(71) Applicant: LG ELECTRONICS INC., Seoul (KR)

(72) Inventors: Hyunho Lee, Seoul (KR); Youngtae Kim, Seoul (KR); Seonwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/748,017

(22) PCT Filed: Sep. 21, 2016

(86) PCT No.: PCT/KR2016/010548
§ 371 (c)(1),
(2) Date: Jan. 26, 2018

(87) PCT Pub. No.: WO2017/052204
PCT Pub. Date: Mar. 30, 2017

(65) Prior Publication Data
US 2018/0220444 A1    Aug. 2, 2018

Related U.S. Application Data

(60) Provisional application No. 62/251,651, filed on Nov. 5, 2015, provisional application No. 62/221,113, filed on Sep. 21, 2015.

(51) Int. Cl.
*H04W 72/12* (2009.01)
*H04W 72/04* (2009.01)
(Continued)

(52) U.S. Cl.
CPC ..... *H04W 72/1289* (2013.01); *H04L 27/2602* (2013.01); *H04L 27/2646* (2013.01);
(Continued)

(58) Field of Classification Search
CPC ......... H04W 72/1289; H04W 72/0453; H04W 72/1263; H04L 27/0602; H04L 27/2646
See application file for complete search history.

(56) References Cited

U.S. PATENT DOCUMENTS

2013/0170464 A1* 7/2013 Hwang ............... H04W 72/082
370/329
2014/0119317 A1* 5/2014 Kim ...................... H04L 5/0048
370/329
(Continued)

FOREIGN PATENT DOCUMENTS

KR    1020120028203    3/2012
WO    2010068069       6/2010

OTHER PUBLICATIONS

PCT International Application No. PCT/KR2016/010548, Written Opinion of the International Searching Authority dated Dec. 28, 2016, 24 pages.
(Continued)

*Primary Examiner* — Wei Zhao
(74) *Attorney, Agent, or Firm* — Lee, Hong, Degerman, Kang & Waimey

(57) ABSTRACT

An embodiment of the present invention relates to a method for receiving a downlink signal for a terminal which is set to operate in multiple frequency bands in a wireless communication system. The method is performed by a terminal, and may comprise the steps of: receiving information on a transmission unit of a control channel transmitted in each of the multiple frequency bands, wherein subcarrier spacing for each of the multiple frequency bands is adaptively adjusted; and detecting the control channel in each of the multiple frequency bands on the basis of the information.

13 Claims, 9 Drawing Sheets

(51) Int. Cl.
*H04L 27/26* (2006.01)
*H04L 5/00* (2006.01)

(52) U.S. Cl.
CPC ... *H04W 72/0453* (2013.01); *H04W 72/1263* (2013.01); *H04L 5/001* (2013.01); *H04L 5/005* (2013.01); *H04L 5/0051* (2013.01); *H04L 27/26* (2013.01)

(56) References Cited

U.S. PATENT DOCUMENTS

2014/0148107 A1    5/2014  Maltsev et al.
2016/0212625 A1*   7/2016  Damnjanovic ... H04W 74/0875

OTHER PUBLICATIONS

Marvell, "MTC Downlink HARQ Timing with Cross-Subframe Scheduling", 3GPP TSG RAN WG1 Meeting #82, R1-154477, Aug. 2015, 3 pages.
Panasonic, "Self-scheduling and cross-scheduling options for unlicensed carrier access", 3GPP TSG RAN WG1 Meeting #82, R1-153978, Aug. 2015, 2 pages.

* cited by examiner

METHOD FOR RECEIVING DOWNLINK CONTROL CHANNEL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/010548, filed on Sep. 21, 2016, which claims the benefit of U.S. Provisional Application Nos. 62/221,113, filed on Sep. 21, 2015 and 62/251,651, filed on Nov. 5, 2015, the contents of which are all hereby incorporated by reference herein in their entirety.

TECHNICAL FIELD

The present invention relates to a wireless communication system, and more particularly, to a method of receiving a downlink control channel in a wireless communication system and an apparatus therefor.

BACKGROUND ART

In a cellular communication system, a base station controls transmission and reception of data transceived with a plurality of user equipments and transmits scheduling information (e.g., time/frequency on which data is to be transmitted, MCS (modulation and coding scheme), HARQ (hybrid automatic retransmission request)-related information on downlink data transmitted to a user equipment) to the user equipment to enable the user equipment to receive data. Similarly, the base station informs the user equipment of uplink scheduling information to enable the user equipment to transmit uplink data. Recently, in order to support a wider bandwidth while utilizing a legacy band distinction, a CA (carrier aggregation) technology has been introduced to transmit downlink data to a single UE by aggregating unit CC (component carrier). In particular, LTE standard considers a self-CC scheduling technology that each cell transmits a control channel including scheduling information and a cross-CC scheduling technology that a cell transmits a control channel including scheduling information of a different cell in a situation that a plurality of CCs (component carriers) of a different duplex mode or the same duplex mode are aggregated. Although a current LTE standard considers CA that transmits downlink data by aggregating 5 CCs, recently, in order to support rapidly increasing traffic load, CA enhancement for transmitting downlink data by aggregating 5 or more CCs (e.g., 8, 16, 32 CCs) is considering. In this case, it is anticipated that the number of bits for UCI such as HARQ-ACK (acknowledgement), CSI (channel state information), and the like is to be rapidly increased. If an error occurs in performing transmission and detection, it may have a great ripple effect due to the error.

DISCLOSURE OF THE INVENTION

Technical Task

A technical task of the present invention is to propose a method of receiving a downlink control channel in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a downlink signal for a user equipment configured to operate on multiple frequency bands in a wireless communication system, includes receiving information on a transmission unit of a control channel transmitted on each of the multiple frequency bands, wherein a subcarrier spacing for each of the multiple frequency bands is adaptively adjusted, and detecting the control channel on each of the multiple frequency bands based on the information.

Additionally or alternatively, when a transmission unit of a different control channel is configured per each of the multiple frequency bands, a control channel of a first frequency band may schedule a data channel of a second frequency band.

Additionally or alternatively, when a transmission unit of a different control channel is configured per each of the multiple frequency bands, the method may further include detecting a control channel of a second frequency band scheduling a data channel of a first frequency band within specific time.

Additionally or alternatively, when a transmission unit of a different control channel is configured per each of the multiple frequency bands, a control channel of a first frequency band having a transmission unit of a control channel of a first length may schedule a data channel of a second frequency band having a transmission unit of a control channel of a second length which is longer than the first length, and a time period of the control channel of the first frequency band may be equal to or shorter than a time period of the control channel of the second frequency band.

Additionally or alternatively, when a transmission unit of a different control channel is configured per each of the multiple frequency bands, a control channel of a first frequency band having a transmission unit of a control channel of a first length may schedule a data channel of a second frequency band having a transmission unit of a control channel of a second length which is shorter than the first length, and the control channel of the first frequency band may schedule a data channel within a specific number of contiguous or discontinuous transmission units among a plurality of transmission units of the control channel of the second length corresponding to the transmission unit of the control channel of the first length.

Additionally or alternatively, the method may further include receiving information on whether or not a control channel for a data channel of the remaining transmission units except the specific number of contiguous or discontinuous transmission units among the plurality of the transmission units of the control channel of the second length is transmitted on the second frequency band or information on a resource region in which the control channel for the data channel of the remaining transmission units is to be detected.

Additionally or alternatively, when a transmission unit of a different control channel is configured per each of the multiple frequency bands, the method may further include receiving information on a candidate frequency band on which a candidate control channel for scheduling a data channel within a specific frequency band is transmitted.

Additionally or alternatively, the method may further include receiving information on a resource region in which a plurality of candidate control channels are detected.

Additionally or alternatively, when a transmission unit of a different control channel is configured per each of the multiple frequency bands, the method may further include receiving information on a candidate frequency band to be scheduled by a control channel within a specific frequency band.

Additionally or alternatively, when a transmission unit of a different control channel may be configured per each of the multiple frequency bands, hybrid automatic retransmission request-acknowledgement (HARQ-ACK) feedback for a specific data channel received within a specific frequency band can be transmitted on the specific frequency band.

Additionally or alternatively, a resource within the specific frequency band may be determined by a control channel element (CCE) in which a control channel that schedules the specific data channel is received or is indicated by information transmitted via the control channel that schedules the specific data channel.

Additionally or alternatively, a HARQ-ACK feedback for a data channel which is received in a transmission unit n within a first frequency band having a transmission unit of a control channel of a first length may be configured to be transmitted in a part of a plurality of transmission units within a second frequency band having a transmission unit of a control channel of a second length which is shorter than the first length corresponding to the transmission unit n.

Additionally or alternatively, when a transmission unit of a different control channel is configured per each of the multiple frequency bands, the transmission unit may be configured to a specific transmission unit within a part of the multiple frequency bands to which a common search space for a control channel for the terminal is configured and/or within a part of frequency bands in which the common search space is configured.

Additionally or alternatively, when a transmission unit of a different control channel is configured per each of the multiple frequency bands, an aggregation level candidate configuration and/or a number of a blind decoding per aggregation level for performing the blind decoding in a specific search space for a control channel for the terminal may be configured per each frequency band.

Additionally or alternatively, when a transmission unit of a different control channel is configured per each of the multiple frequency bands, information on whether scheduling is performed on a self-frequency band or on a different frequency band per each of the multiple frequency bands.

To further achieve these and other advantages and in accordance with the purpose of the present invention, according to a different embodiment, a terminal configured to operate on multiple frequency bands in a wireless communication system includes a transmitter and a receiver and a processor that controls the transmitter and the receiver, the processor receives information on a transmission unit of a control channel transmitted on each of the multiple frequency bands, wherein a subcarrier spacing for each of the multiple frequency bands is adaptively adjusted, detects the control channel on each of the multiple frequency bands based on the information.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently receive or transmit a downlink control channel in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode For Invention

Figure 1:
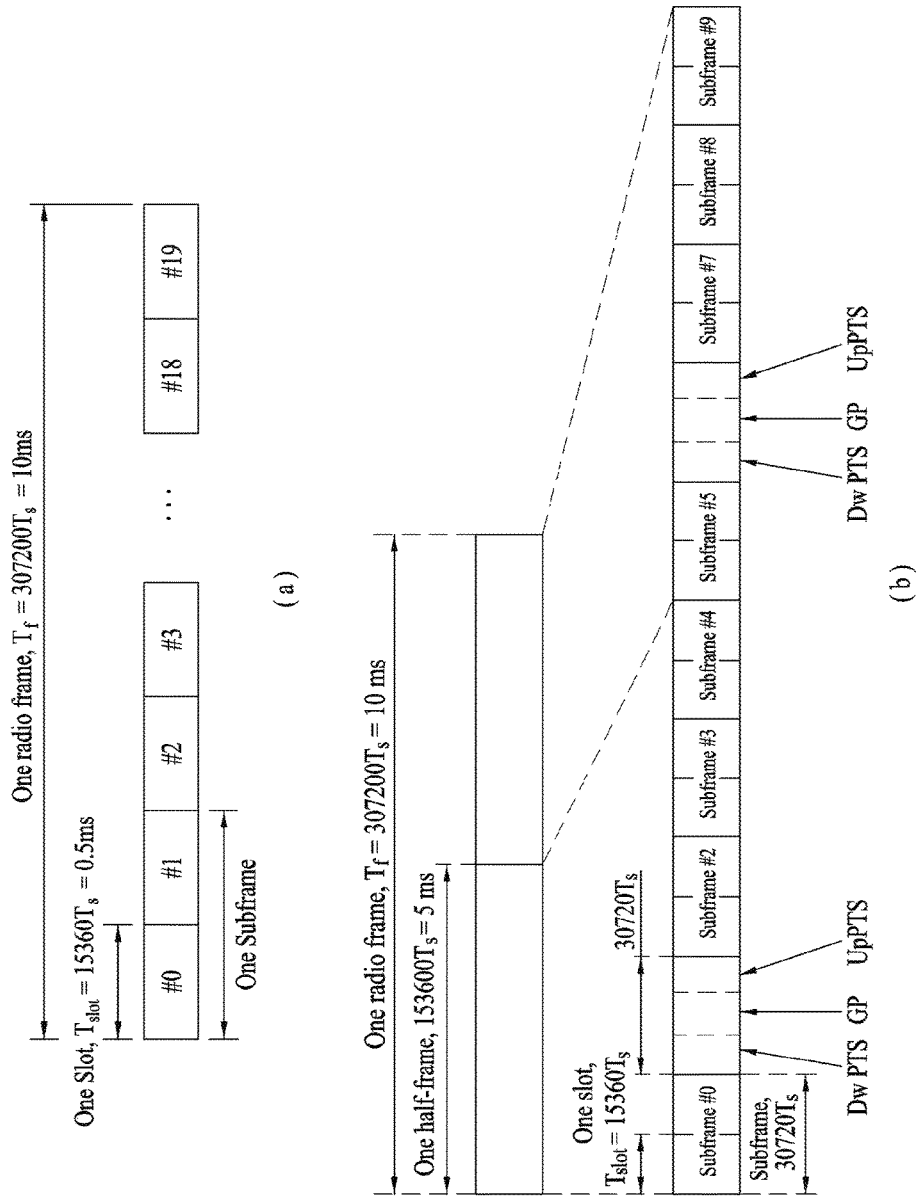
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, Pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
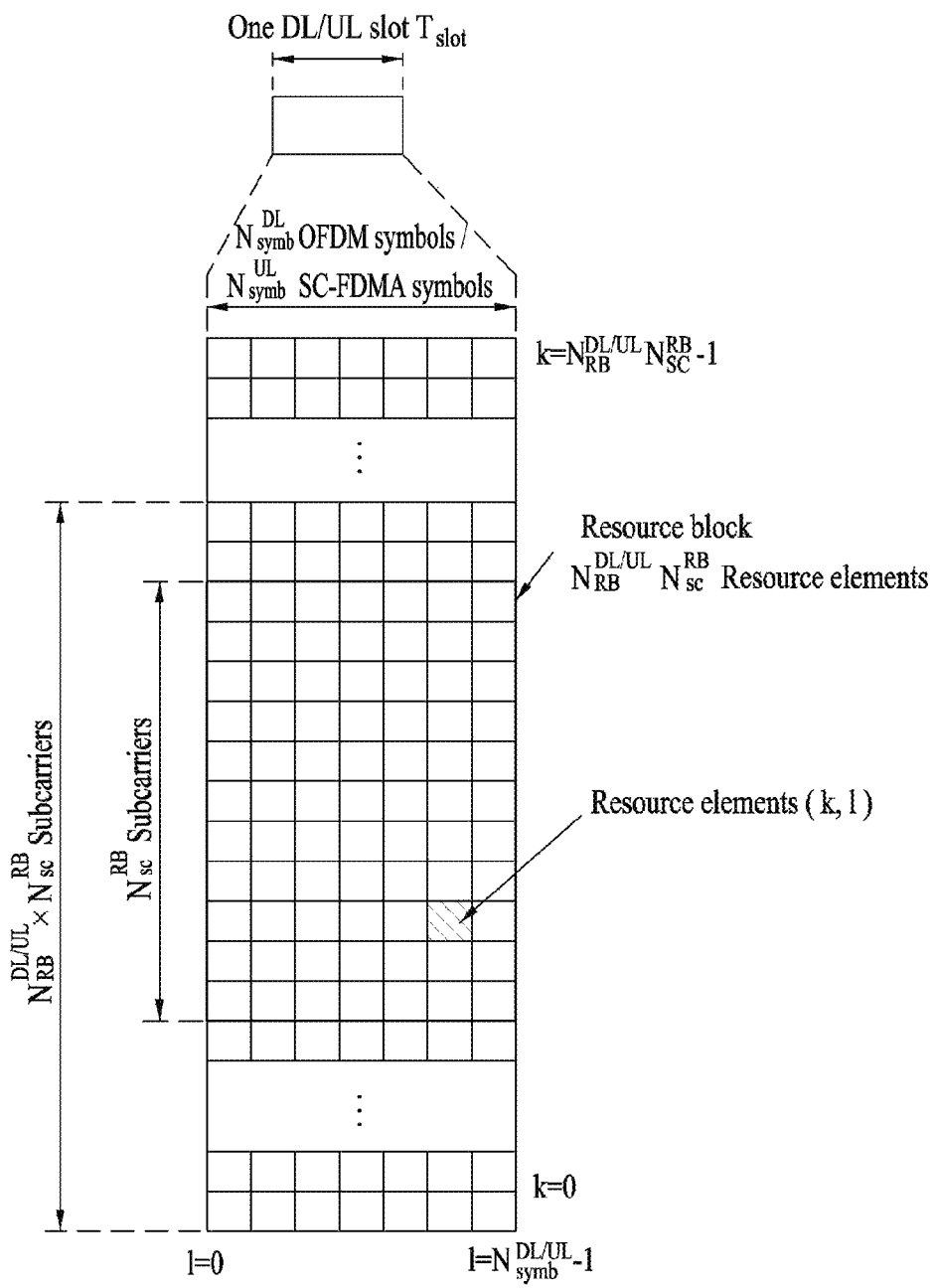
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{NB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols.

Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
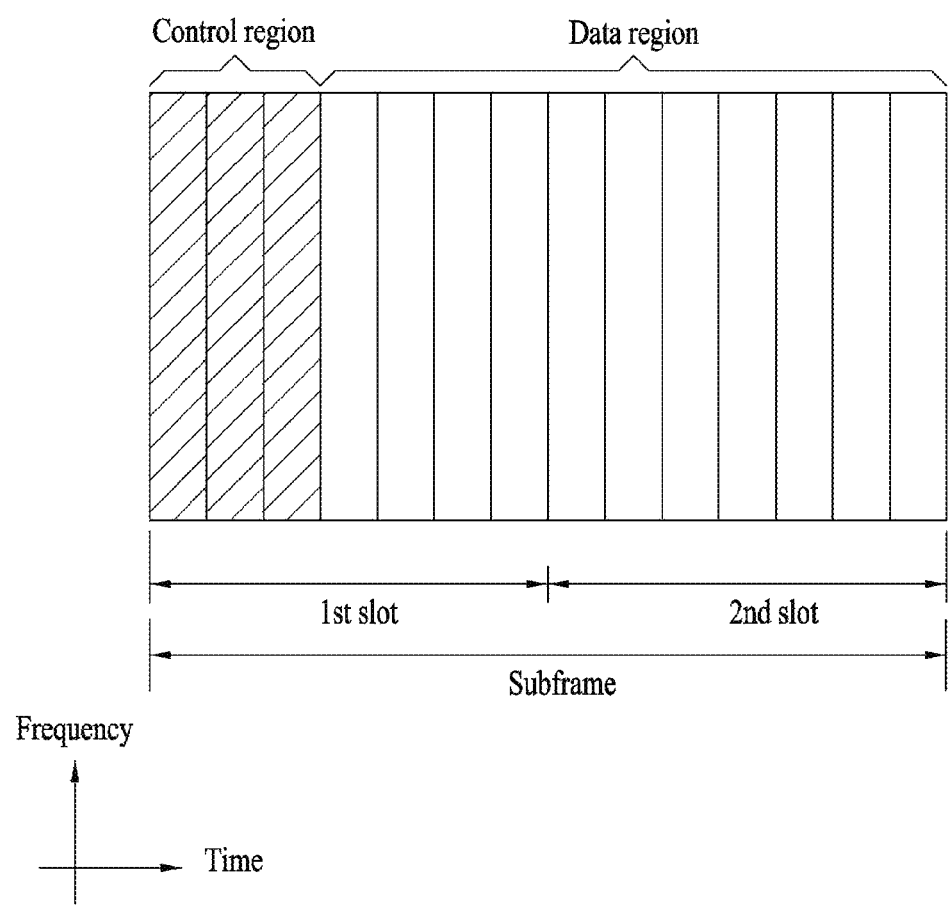
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and h formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot.

Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
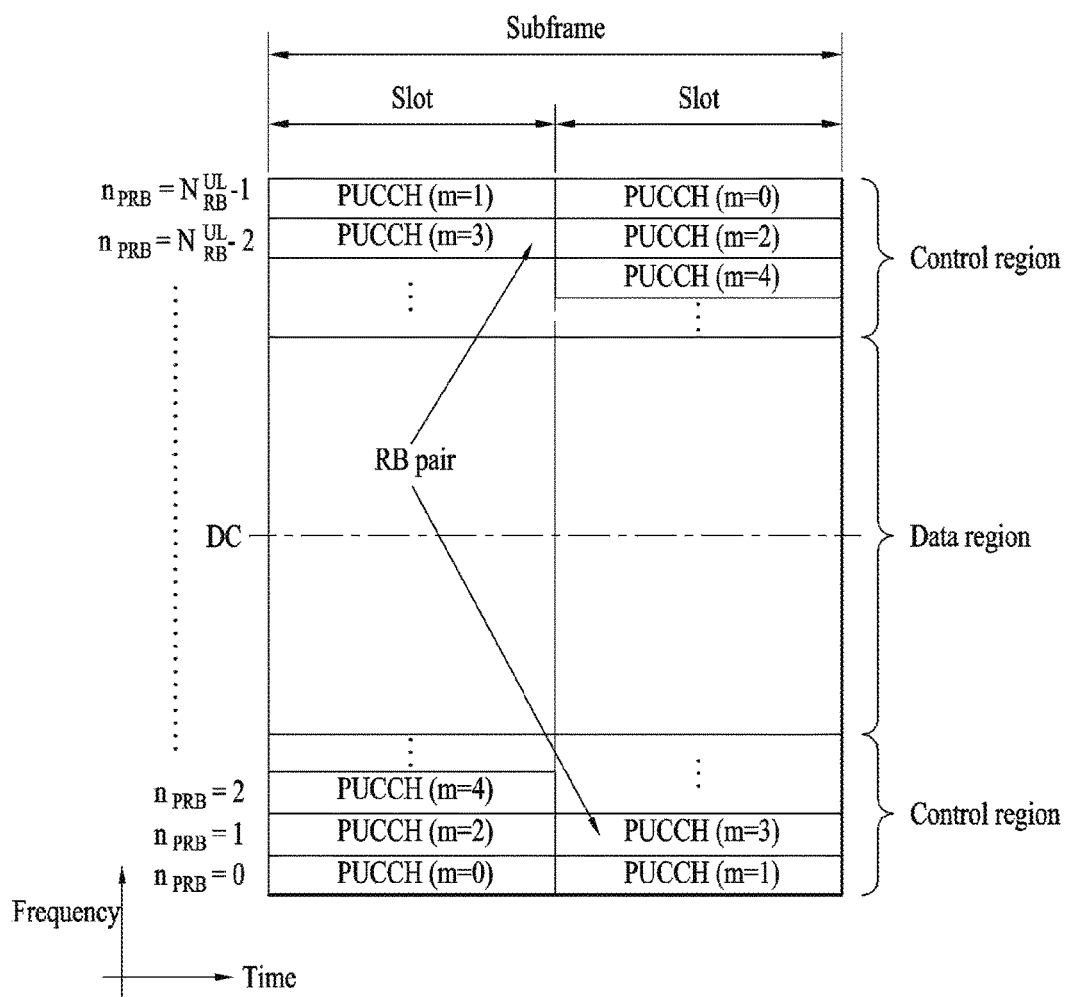
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4 bit) 2nd wideband CQI(4 bit) if RI >1 N * Subband PMI(4 bit) (N is the total # of subbands) (if 8Tx Ant, N * subband W2 + wideband W1) |

TABLE 6-continued

|  |  | PMI Feedback Type | | |
|---|---|---|---|---|
|  |  | No PMI | Single PMI | Multiple PMIs |
| UE selected (Subband CQI) | | Mode 2-0<br>RI (only for Open-loop SM)<br>1st wideband CQI(4 bit) + Best-M CQI(2 bit)<br>(Best-M CQI: An average CQI for M SBs selected from among N SBs)<br>Best-M index (L bit) | | Mode 2-2<br>RI<br>1st wideband CQI(4 bit) + Best-M CQI(2 bit)<br>2nd wideband CQI(4 bit) + Best-M CQI(2 bit) if RI >1<br>Best-M index (L bit)<br>Wideband PMI(4 bit) + Best-M PMI(4 bit)<br>(if 8Tx Ant, wideband W2 + Best-M W2 + wideband W1) |
| Higher Layer-configured (Subband CQI) | | Mode 3-0<br>RI (only for Open-loop SM)<br>1st wideband CQI(4 bit) + N * subband CQI(2 bit) | Mode 3-1<br>RI<br>1st wideband CQI(4 bit) + N * subbandCQI(2 bit)<br>2nd wideband CQI(4 bit) + N * subbandCQI(2 bit) if RI >1<br>Wideband PMI(4 bit)<br>(if 8Tx Ant, wideband W2 + wideband W1) | Mode 3-2<br>RI<br>1st wideband CQI(4 bit) + N * subbandCQI(2 bit)<br>2nd wideband CQI(4 bit) + N * subbandCQI(2 bit) if RI >1<br>N * Subband PMI(4 bit)<br>(N is the total # of subbands)<br>(if 8Tx Ant, N * subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  | PMI feedback type | |
| --- | --- | --- |
|  | No PMI | Single PMI |
| PUCCH CQI feedback type Wideband (wideband CQI) | Mode 1-0 | Mode 1-1 |
| UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
| --- | --- |
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
| --- | --- |
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

In a cellular communication system, a base station controls transmission and reception of data transceived with a plurality of user equipments and transmits scheduling information (e.g., time/frequency on which data is to be transmitted, MCS (modulation and coding scheme), HARQ (hybrid automatic retransmission request)-related information on downlink data transmitted to a user equipment) to the user equipment to enable the user equipment to receive data. Similarly, the base station informs the user equipment of uplink scheduling information to enable the user equipment to transmit uplink data. Recently, in order to support a wider bandwidth while utilizing a legacy band distinction, a CA (carrier aggregation) technology has been introduced to transmit downlink data to a single UE by aggregating unit CC (component carrier). In particular, LTE standard considers a self-CC scheduling technology that each cell transmits a control channel including scheduling information and a cross-CC scheduling technology that a cell transmits a control channel including scheduling information of a different cell in a situation that a plurality of CCs (component carriers) of a different duplex mode or the same duplex mode are aggregated. Although a current LTE standard considers CA that transmits downlink data by aggregating 5 CCs, recently, in order to support rapidly increasing traffic load, CA enhancement for transmitting downlink data by aggregating 5 or more CCs (e.g., 8, 16, 32 CCs) is considering.

A next wireless communication system considers securing a higher data transfer rate via communication on a higher frequency band (e.g., 6 or 60 GHz band). Meanwhile, according to current LTE standard, as shown in the following <reference>, CFO (carrier frequency error) minimum requirement is defined for an eNB and a UE.

<Reference>

The modulated carrier frequency of each E-UTRA carrier configured by the BS shall be accurate to within the accuracy range observed over a period of one subframe (1 ms).

TABLE 10

| BS class | Accuracy |
| --- | --- |
| Wide Area BS | ±0.05 ppm |
| Medium Range BS | ±0.1 ppm |
| Local Area BS | ±0.1 ppm |
| Home BS | ±0.25 ppm |

The UE modulated carrier frequency shall be accurate to within ±0.1 PPM observed over a period of one time slot (0.5 ms) compared to the carrier frequency received from the E-UTRA Node B.

For intra-band contiguous carrier aggregation, the UE modulated carrier frequencies per band shall be accurate to within ±0.1 PPM observed over a period of one timeslot compared to the carrier frequency of primary component carrier received from the E-UTRA in the corresponding band.

Figure 5:
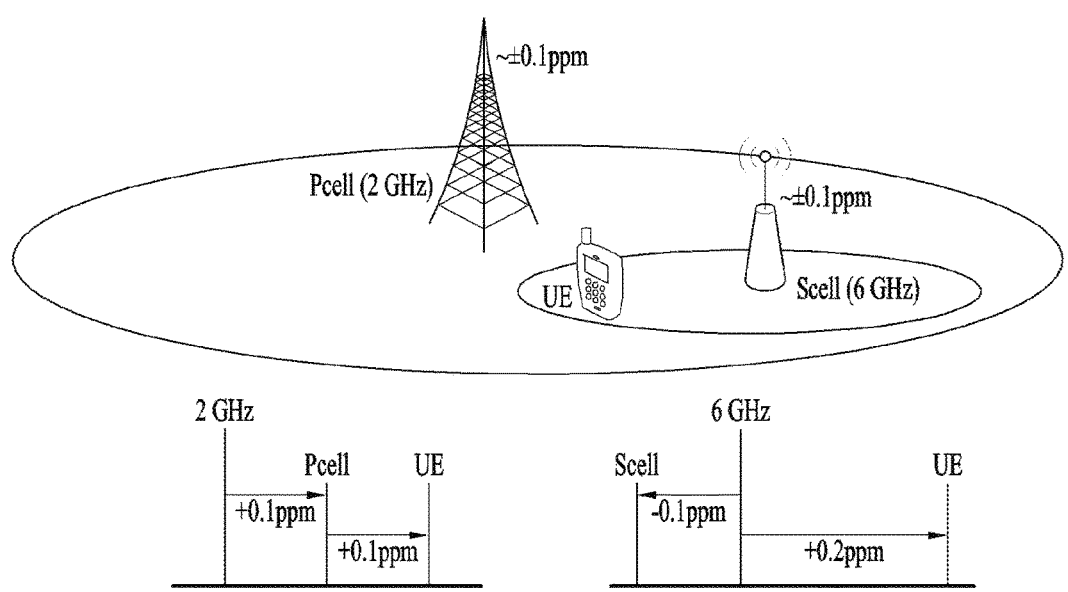
FIG. 5 is a diagram illustrating a carrier frequency error of a terminal served by two cells operating on a different band.

For example, as shown in FIG. 5, it may consider a case that a macro eNB supports legacy 2 GHz band communication as a Pcell and a pico eNB supports 6 GHz band communication as a S cell. In this case, the Pcell eNB has a frequency error of ±0.1 PPM from 2 GHz carrier frequency and a UE, which has a frequency error of ±0.1 PPM, has a frequency error of ±0.2 PPM (2 GHz+400 Hz) in total from 2 GHz carrier frequency. According to a current implementation scheme of a UE, when the UE receives a signal from the S cell, it is anticipated that the UE does not perform readjustment from a carrier frequency in the Pcell. Hence, the UE may also have a frequency error of ±0.2 PPM from 6 GHz carrier frequency. If an eNB has a frequency error of −0.1 PPM in the S cell, it is anticipated that the UE will experience a frequency error of 1800 Hz in total from an actual signal.

In particular, if a relatively higher carrier frequency band is used, a UE will experience a bigger frequency error in accordance with the higher carrier frequency band. Yet, due to the restriction on a frequency resource, the use of a high frequency band is inevitable. Hence, in order to reduce the frequency error, adjusting subcarrier spacing may become a solution.

Figure 6:
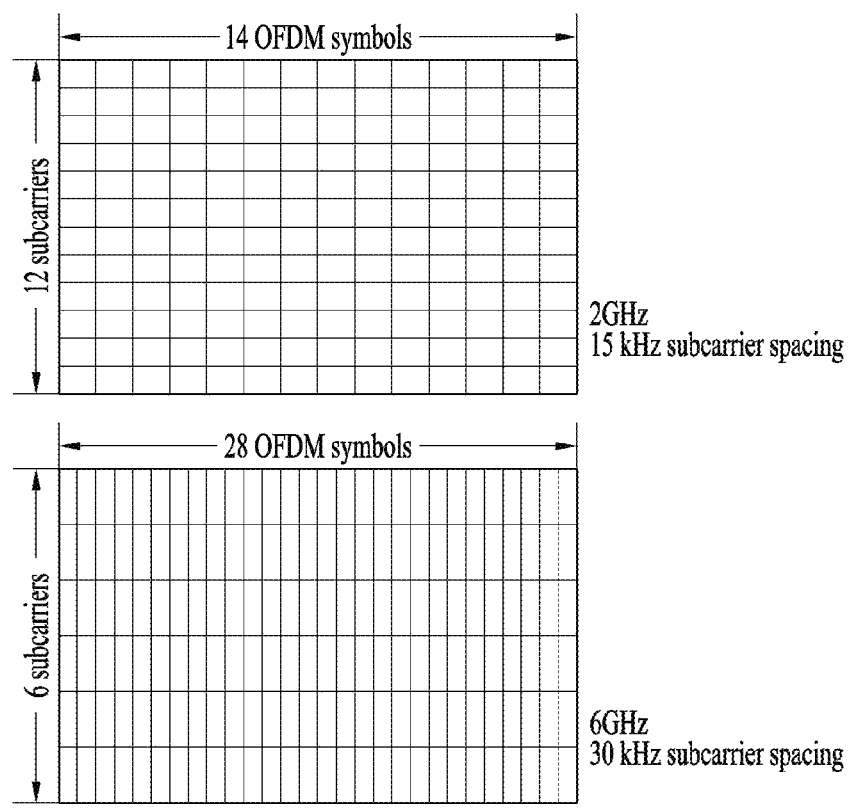
FIG. 6 is a diagram illustrating bands having different subcarrier spacing.

A next system considers a method of adaptively adjusting subcarrier spacing according to a band. For example, as shown in FIG. 6, it may be able to configure legacy 15 kHz subcarrier spacing to be maintained in 2 GHz and configure bigger subcarrier spacing to be used in a high frequency band. In particular, when each subcarrier spacing is defined for a plurality of bands, it is necessary to consider such an issue as a scheduling unit for performing UL/DL communication in a high frequency band, ACK/NACK timeline unit, and the like. The present invention proposes a method of transmitting and receiving a signal in a system in which subcarrier spacing is adaptively adjusted according to a band of a carrier frequency. In the proposal described in the following, as shown in FIG. 6, although an example of performing transmission and reception in 6 GHz band is explained under the assumption of double subcarrier spacing, it is apparent that the proposed method is also applicable to a system of a random band having different subcarrier spacing.

[Proposal 1]

When subcarrier spacing is adaptively adjusted according to a band of a carrier frequency, a control channel can be transmitted in a form described in the following. As shown in FIG. 6, in a system where subcarrier spacing is adaptively adjusted according to a frequency band, if a time resource region as much as the number of OFDM symbols is scheduled using a control channel such as (E)PDCCH, PUCC, or the like, it may be able to more frequently transmit a control channel. Hence, it is anticipated that it is able to obtain a flexible resource utilization effect. On the contrary, if a resource region of 1 ms is scheduled using a control channel such as (E)PDCCH, PUCC, or the like, since resources for transmitting a control channel become relatively less compared to a legacy system, it is anticipated that it is able to obtain a higher resource utilization effect. The present specification proposes behaviors of a base station and a UE in a situation that subcarrier spacing is adaptively controlled according to a band of a carrier frequency. For clarity, assume that a control signal and a data signal are transmitted in a TTI (transmission time interval) unit.

[1-1] It may be able to define a plurality of transmission units of a DL channel (e.g., (E)PDCCH) in advance and configure a transmission unit of a control channel to be detected by a UE in a specific band during prescribed time via higher layer signaling. Or, it may be able to dynamically indicate a transmission unit of a control channel to be detected by a UE in a specific band (via physical layer signaling). For example, it may be able to inform a UE of a transmission unit that a control channel is transmitted in every 1 ms in 2 GHz band and a control channel is transmitted in every 0.5 ms in 6 GHz band via higher layer signaling.

[1-2] If a transmission unit of a control channel to be detected by a UE is differently defined according to a band, cross-band scheduling is available. In particular, a band can transmit a control channel for scheduling a cell of a different band including a different control channel transmission unit. For clarity, a cell of a band of which a transmission unit of a control channel is relatively short is referred to as "$cell_S$" and a cell of a band of which a transmission unit of a control channel is relatively long is referred to as "$cell_L$". And, time corresponding to TTI of the $cell_S$ is referred to as $TTI_S$ and time corresponding to TTI of the $cell_L$ is referred to as $TTI_L$, respectively.

If a transmission unit of a control channel to be detected by a UE is differently defined according to a band and the $cell_S$ performs cross-band scheduling on the $cell_L$, a UE attempts to detect a control channel for performing data channel scheduling of the $cell_L$ within time corresponding to the $TTI_L$.

More generally, if a transmission unit of a control channel to be detected by a UE is differently defined according to a band and the $cell_S$ performs cross-band scheduling on the $cell_L$, a UE attempts to detect a control channel for performing data channel scheduling of the $cell_L$ within specific time indicated via predefined/predetermined signaling. This method may apply flexibility to transmission timing of a control channel. On the contrary, the method may increase blind detection complexity of a UE and buffering for data.

If a transmission unit of a control channel to be detected by a UE is differently defined according to a band and the $cell_S$ performs cross-band scheduling on the $cell_L$, a control channel for the cross-band scheduling is transmitted within time equal to or shorter than a control region (i.e., a time period capable of transmitting a control channel, e.g., first 3 OFDM symbols in a subframe in current LTE) of self-band scheduling performed in the $cell_L$. A UE attempts to detect the control channel within the time.

Figure 7:
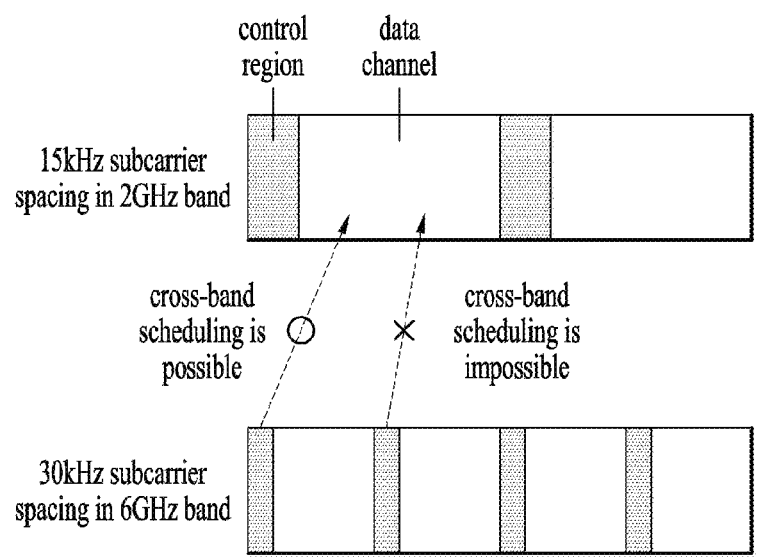
FIG. 7 is a diagram illustrating a case of configuring cross-band scheduling between bands having a different transmission unit according to one embodiment of the present invention.

For example, as shown in FIG. 7, when a control channel is transmitted in every 1 ms in 2 GHz band, a control channel is transmitted in every 0.5 ms in 6 GHz band, and cross-band scheduling is performed on a cell of 2 GHz band in a cell of 6 GHz band, the cross-band scheduling can be performed by a control channel of the cell of 6 GHz band transmitted within a time period corresponding to a control region of the cell of 2 GHz band.

Figure 8:
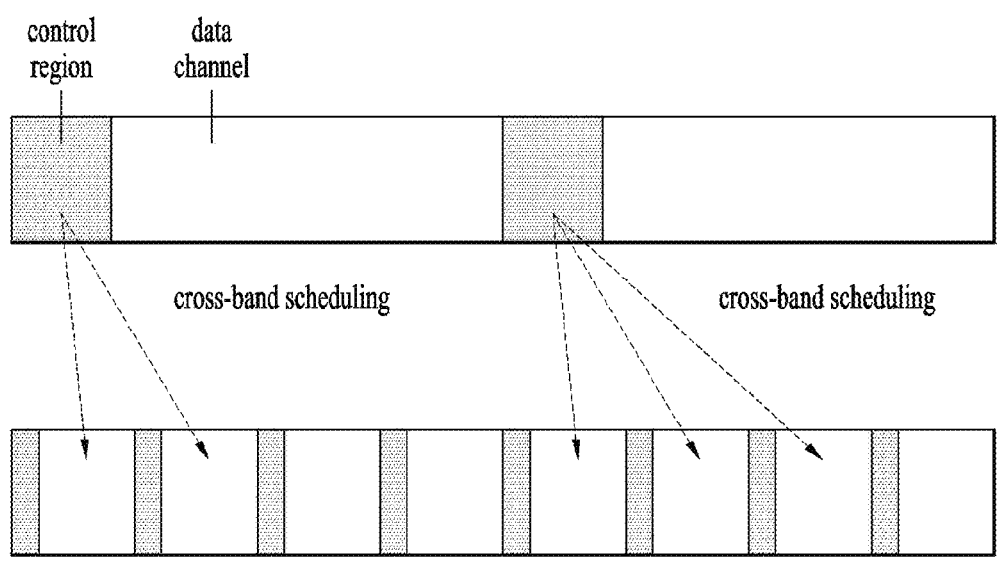
FIG. 8 is a diagram illustrating a case of configuring cross-band scheduling between bands having a different transmission unit according to one embodiment of the present invention.

Additionally or alternatively, if a transmission unit of a control channel to be detected by a UE is differently defined according to a band and the $cell_L$ performs cross-band scheduling on the $cell_S$, it may be able to define a rule in advance or indicate via signaling that a control channel for the cross-band scheduling schedules a data channel corresponding to time as much as the specific number of continuous/discontinuous $TTI_S$ among a plurality of $TTI_{Ss}$, corresponding to $TTI_L$. For example, a time period corresponding to a scheduling target of the control channel can be defined or indicated by the first N number of $TTI_{Ss}$. FIG. 8 illustrates an example of performing cross-band scheduling when N=2 is set to the first $TTI_L$ and N=3 is set to the second $TTI_L$.

Additionally or alternatively, if a transmission unit of a control channel to be detected by a UE is differently defined according to a band and the $cell_L$ performs cross-band scheduling on a data channel of a time period corresponding to a partial $TTI_S$ of the $cell_S$, it may be able to define a rule that information on whether or not a control channel for the remaining data channel is transmitted in the $cell_S$ (i.e., whether or not self-band scheduling is performed in a band to which the $cell_S$ belongs thereto) or information on a resource region (e.g., time/frequency resource, etc.) in which the control channel is to be detected by the UE is indicated by predefined/predetermined signaling. Or, it may predefine a rule that scheduling is to be implicitly performed on the remaining data channel.

Additionally or alternatively, if a transmission unit of a control channel to be detected by a UE is differently defined according to a band, it may define a rule that a plurality of bands capable of performing cross-band scheduling on a data channel of a cell within a specific band are to be predefined/predetermined/configured in advance or to be indicated via signaling. If a transmission unit of a control channel to be detected by a UE is differently defined according to a band, it may define a rule that a cell in which a control channel is transmitted within a band capable of performing cross-band scheduling is to be predefined/predetermined/configured in advance or to be indicated via signaling. In this case, the band capable of performing the cross-band scheduling can be restricted to a band to which a scheduling target cell belongs thereto and a band of which a transmission unit of a control channel is different. And, it may set a limit on the number of cells capable of transmitting a control channel for the cross-band scheduling according to a band.

If a transmission unit of a control channel to be detected by a UE is differently defined according to a band and there are a plurality of bands capable of performing cross-band scheduling on a data channel of a cell within a specific band, it may be able to define a rule that information on a resource region (e.g., time/frequency resource, etc.) in which a control channel of each band is to be detected by the UE is to be predefined/predetermined or is to be indicated via signaling.

[1-3] if subcarrier spacing is adaptively adjusted according to a band, it may be able to define a rule for a TDD UL/DL configuration for each cell corresponding to a different band.

If a specific UL/DL configuration is indicated to $TTI_L$ including a plurality of $TTI_S$, a UE comprehends it as U/D/S (uplink/downlink/special subframe) of the UL/DL configuration respectively indicate a single $TTI_S$. For example, if UL/DL configuration #2 is set to $TTI_L$ including two $TTI_{Ss}$, each of the $TTI_{Ls}$ is sequentially interpreted as D, S, U, D, D, D, S, U, D, and D in $cell_L$ and each of the $TTI_{Ls}$ is sequentially interpreted as DS, UD, DD, SU, DD, DS, UD, DD, SU, and DD in $cell_S$. This method can expect an effect that UL/DL configurations of all bands are represented by a single table without individually defining a mapping table for UL/DL configuration according to a band. However, since a third $TTI_L$ corresponding to DL, which corresponds to a fifth $TTI_S$ and a sixth $TTI_S$, is UL, it may be difficult to perform cross-band scheduling.

Additionally or alternatively, if a specific UL/DL configuration is indicated to $TTI_L$ including a plurality of $TTI_{Ss}$, a UE comprehends it as U/D corresponding to a specific $TTI_L$ of $cell_L$ is configured by the same value for a plurality of the $TTI_{Ss}$. Yet, "S" corresponding to the specific $TTI_L$ of the $cell_L$ comprehends a partial forepart $TTI_S$ as "D" among a plurality of the $TTI_{Ss}$. This method can also expect an effect that UL/DL configurations of all bands are represented by a single table without individually defining a mapping table for UL/DL configuration according to a band. And, it may be able to expect an effect more DLs are configured in the $cell_S$. In this case, if specific $TTI_L$ of the $cell_L$ is indicated by "S", the number of forepart $TTI_S$ comprehended as "D" among a plurality of the $TTI_{Ss}$ of the $cell_S$ can be indicated by predefined physical layer signaling or higher layer signaling or can be promised in advance. For example, If UL/DL configuration #0 is set to $TTI_L$ including two $TTI_{Ss}$, each of the $TTI_{Ls}$ is sequentially interpreted as D, S, U, U, U, D, S, U, U, and U in $cell_L$ and each of the $TTI_{Ls}$ is sequentially interpreted as DD, DS, UU, UU, UU, DS, DD, DS, UU, and UU in $cell_S$.

[1-4] If a transmission unit of a control channel to be detected by a UE is differently defined according to a band and cross-band scheduling is performed on a DL data channel of a cell within a specific band, a scheduling target time period of the DL data channel scheduled by the control channel can be defined/promised/configured in advance or can be indicated via signaling.

Similarly, if a transmission unit of a control channel to be detected by a UE is differently defined according to a band and cross-band scheduling is performed on a UL data channel of a cell within a specific band, a scheduling target time period of the UL data channel scheduled by the control channel can be defined/promised/configured in advance or can be indicated via signaling.

[1-5] If a transmission unit of a control channel to be detected by a UE is differently defined according to a band, a time period in which a control channel is not transmitted can be defined/promised/configured in advance or can be indicated via signaling. For example, the time period in which the control channel is not transmitted can be configured in a TTI unit or a different time unit. Hence, the UE expects that a data channel can be transmitted until a resource in which the control channel is transmitted in the time period.

[1-6] Determination of HARQ-ACK Feedback Resource for CBS (Cross-band Scheduling)

If a transmission unit of a control channel to be detected by a UE is differently defined according to a band, it may be able to define a rule that corresponding HARQ-ACK feedback is transmitted in a manner of being mapped to a time/frequency resource region of a specific cell on a specific band.

Specifically, if a transmission unit of a control channel to be detected by a UE is differently defined according to a band, it may be able to define a rule that HARQ-ACK feedback for specific PDSCH is transmitted in a Pcell or a predefined specific cell of a specific band of a high priority. A resource in which the HARQ-ACK feedback is transmitted can be implicitly indicated by a CCE resource corresponding to a control channel carrying a DL grant of a scheduling cell or a promised field of a control channel carrying a DL grant for scheduling the PDSCH among resources designated via higher layer signaling in advance. In particular, if a band configured to transmit the scheduling cell is different from a band configured to transmit the HARQ-ACK feedback, it may newly define a link of a resource in which the HARQ-ACK feedback is transmitted linked with the CCE resource corresponding to the control channel carrying the DL grant to transmit the HARQ-ACK feedback.

[1-6-1υ] HARQ-ACK Feedback Transmission Timing for CBS (Cross-band Scheduling)

Figure 9:
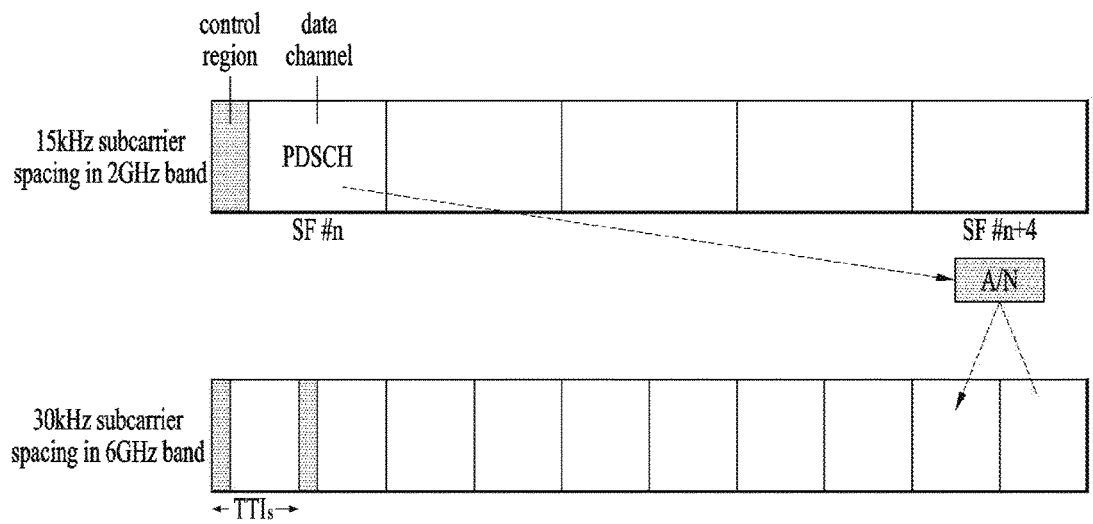
FIG. 9 is a diagram illustrating HARQ-ACK feedback transmission timing according to one embodiment of the present invention.

Transmission timing of HARQ-ACK feedback (channel) can be defined/promised/configured in advance or can be indicated via signaling. Or, the transmission timing can be determined according to "HARQ-ACK timing predefined for specific band". Specifically, if HARQ-ACK feedback (channel) for PDSCH scheduled to the $cell_L$ is transmitted in the $cell_S$, it may be able to define a rule that the HARQ-ACK feedback is transmitted in predetermined/promised specific $TTI_S$ or specific $TTI_S$ indicated via signaling. In this case, the specific $TTI_S$ can be restricted to specific $TTI_S$ among a plurality of $TTI_{Ss}$ corresponding to $TTI_L$ corresponding to feedback timing (e.g., $(n+4)^{th}$ $TTI_L$ when scheduling is performed at $n^{th}$ $TTI_L$) according to legacy HARQ-ACK timing. FIG. 9 illustrates an example of the specific $TTI_S$.

[1-7] Definition of Band to Which CSS is Set or In-band Cell

If a transmission unit of a control channel to be detected by a UE is differently defined according to a band, it may be able to define a rule that a CSS (common search space) is configured on a specific band (or, a specific cell on the specific band) only. And, information on whether or not the CSS is configured on the specific band (or, a specific cell on the specific band) only and information on the specific band/cell can be defined/promised/configured in advance or can be indicated via signaling.

Additionally or alternatively, it may be able to define a rule that a CSS is configured in partial TTI only among a plurality of TTIs capable of being defined within specific time (e.g., 1 ms) or a specifically designated TTI(s) only for a specific cell of a specific band. And, information on the specific TTI(s) in which the CSS is configurable can be defined/promised/configured in advance or can be indicated via signaling.

[1-8] AL Candidate Configuration and BD Count in Specific Search Space According to Band If a transmission unit of a control channel to be detected by a UE is differently defined according to a band, an AL (aggregation level) candidate configuration and/or BD count (per AL) for performing control channel blind decoding performed by a UE in a specific search space (e.g., UE-specific search space) in which a control channel is transmitted can be differently configured according to a band. An example described in the following illustrates an example of configuring the BD count, by which the present invention may be non-limited. It is apparent that random methods for configuring a different BD count according to a band also belong to the scope of the present invention.

Specifically, assume that BD performed by a legacy UE during 1 ms corresponds to N. In this case, in case of a UE performing self-band scheduling only, the BD count can be configured as follows.

If K number of TTIs is defined within 1 ms, BD count as many as K*N can be configured.

In order to reduce BD complexity, it may be able to configure BD to be performed on partial TTI only among a plurality (K) of TTIs corresponding to prescribed time (e.g., 1 ms). For example, it may be able to configure BD to be performed on specific TTI(s) N times and configure BD not to be performed on the remaining TTI(S). As a different example, in order to make the total BD count to be equal to or less than a prescribed count, it may be able to individually configure BD count for each TTI among a plurality of TTIs corresponding to prescribed time (e.g., 1 ms).

In case of a UE configured to perform both cross-band scheduling and self-band scheduling, BD count can be configured as follows.

If K1 number of TTIs of a band performs cross-band scheduling and K2 number of TTIs of a band performs self-band scheduling, BD count as many as K1*N+K2*N can be configured within 1 ms.

In order to reduce BD complexity, it may configure the total BD count to be equal to or less than a prescribed count.

For example, in order to make K1*N+K2*N to be equal to or less that a prescribed count, M1 and M2 can be selected to configure BD count of each band. As a different example, in order to make the total BD count to be equal to or less that prescribed counts, BD count within a plurality of TTIs corresponding to prescribed time (e.g., 1 ms) can be individually configured according to a band and/or TTI.

[1-9] If a transmission unit of a control channel to be detected by a UE is differently defined according to a band, whether the control channel is self-band scheduled or cross-band scheduled according to a band (or, a cell) can be configured via higher layer/physical layer signaling. If a position at which the control channel is transmitted is switched according to TTI, it may have an effect that signaling overhead is distributed.

The aforementioned proposed method considers a situation that subcarrier spacing is adaptively controlled according to a band of a carrier frequency. Yet, the method can also be applied to a case that a transmission unit of a control channel and/or a data is differently defined in environment that subcarrier spacing of each of bands is the same. In the foregoing description, "if a transmission unit of a control channel to be detected by a UE is differently defined according to a band" can be applied to all proposed methods in a manner of being replaced with "if subcarrier spacing is differently configured according to a band".

Figure 10:
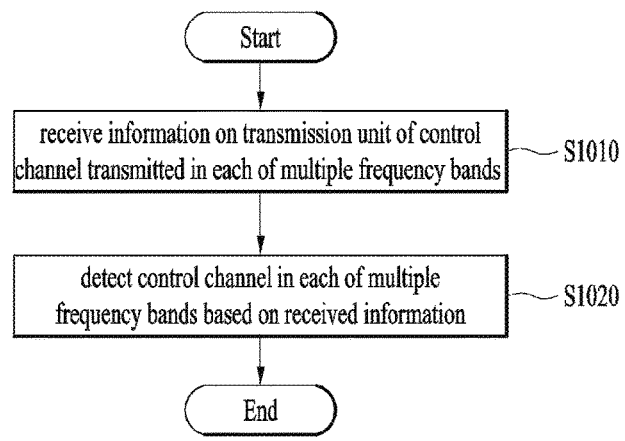
FIG. 10 is a flowchart illustrating an operation according to one embodiment of the present invention.

FIG. 10 is a flowchart illustrating an operation according to one embodiment of the present invention.

FIG. 10 relates to a method of receiving a downlink signal for a terminal configured to operate in multiple frequency bands in a wireless communication system.

The terminal may receive information on a transmission unit of a control channel transmitted on each of multiple frequency bands [S1010]. A subcarrier spacing for each of the multiple frequency bands may be adaptively adjusted.

The terminal may detect the control channel on each of the multiple frequency bands based on the information [S1020].

Further, when a transmission unit of a different control channel is configured per each of the multiple frequency bands, a control channel of a first frequency band may schedule a data channel of a second frequency band.

Further, when a transmission unit of a different control channel is configured per each of the multiple frequency bands, the terminal may detect a control channel of a second frequency band that schedules a data channel of a first frequency band within specific time.

Further, when a transmission unit of a different control channel is configured per each of the multiple frequency bands, a control channel of a first frequency band having a transmission unit of a control channel of a first length may schedule a data channel of a second frequency band having a transmission unit of a control channel of a second length which is longer than the first length, and a time period of the control channel of the first frequency band may be equal to or shorter than a time period of the control channel of the second frequency band.

Further, when a transmission unit of a different control channel is configured per each of the multiple frequency bands, a control channel of a first frequency band having a transmission unit of a control channel of a first length schedules a data channel of a second frequency band having a transmission unit of a control channel of a second length which is shorter than the first length, and the control channel of the first frequency band can schedule a data channel within a specific number of contiguous or discontinuous transmission units among a plurality of transmission units of the control channel of the second length corresponding to the transmission unit of the control channel of the first length.

Further, the terminal may receive information on whether or not a control channel for a data channel of the remaining transmission units except the specific number of contiguous or discontinuous transmission units among the plurality of the transmission units of the control channel of the second length is transmitted on the second frequency band or information on a resource region in which the control channel for the data channel of the remaining transmission units is to be detected.

Further, when a transmission unit of a different control channel is configured per each of the multiple frequency bands, the terminal may receive information on a candidate frequency band on which a candidate control channel for scheduling a data channel within a specific frequency band is transmitted.

Further, the terminal may receive information on a resource region in which a plurality of candidate control channels are detected.

Further, when a transmission unit of a different control channel is configured per each of the multiple frequency bands, the terminal may receive information on a candidate frequency band to be scheduled by a control channel within a specific frequency band.

Further, when a transmission unit of a different control channel is configured per each of the multiple frequency bands, hybrid automatic retransmission request-acknowledgement(HARQ-ACK) for a specific data channel received within a specific frequency band may be transmitted on the specific frequency band.

Further, a resource within the specific frequency band may be determined by a CCE in which a control channel that schedules the specific data channel is received or is indicated by information transmitted via the control channel that schedules the specific data channel.

Further, a HARQ-ACK feedback for a data channel which is received in a transmission unit n within a first frequency band having a transmission unit of a control channel of a first length can be configured to be transmitted in a part of a plurality of transmission units within a second frequency band having a transmission unit of a control channel of a second length which is shorter than the first length corresponding to the transmission unit n.

Further, when a transmission unit of a different control channel is configured per each of the multiple frequency bands, the transmission unit may be configured to a specific transmission unit within a part of the multiple frequency bands to which a common search space for a control channel for the terminal is configured and/or within a part of frequency bands in which the common search space is configured.

Further, when a transmission unit of a different control channel is configured per each of the multiple frequency bands, an aggregation level candidate configuration and/or a number of a blind decoding per aggregation level for performing the blind decoding in a specific search space for a control channel for the terminal may be configured per each frequency band.

Further, when a transmission unit of a different control channel is configured per each of the multiple frequency bands, information on whether scheduling is performed on a self-frequency band or on a different frequency band per each of the multiple frequency bands.

In the foregoing description, embodiments of the present invention have been briefly explained with reference to FIG. 10. An embodiment related to FIG. 10 can alternatively or additionally include at least a part of the aforementioned embodiments.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Figure 11:
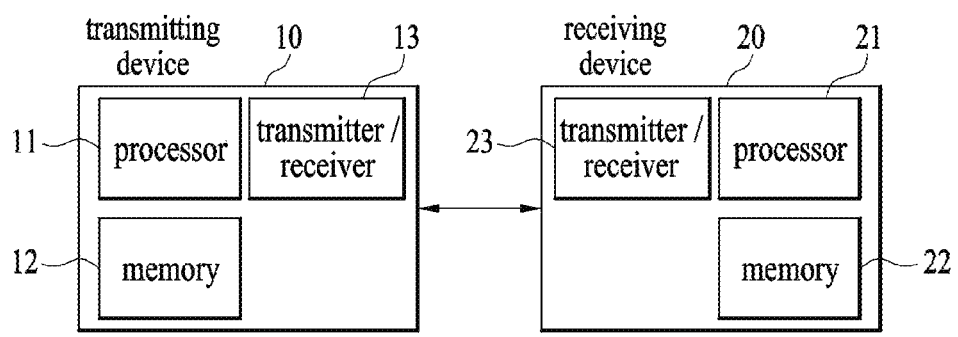
FIG. 11 is a block diagram of a device for implementing embodiment(s) of the present invention.

FIG. 11 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmiting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method for a terminal configured to operate on multiple frequency bands in a wireless communication system, comprising:
   receiving information on a transmission unit of a control channel transmitted on each of the multiple frequency bands, wherein a subcarrier spacing for each of the multiple frequency bands is adaptively adjusted; and
   detecting the control channel on each of the multiple frequency bands based on the information,
   wherein when a transmission unit of a different control channel is configured per each of the multiple frequency bands, a control channel of a first frequency band having a transmission unit of a control channel of a first length schedules a data channel of a second frequency band having a transmission unit of a control channel of a second length, and
   wherein if the second length is longer than the first length, a time period of the control channel of the first frequency band is equal to or shorter than a time period of the control channel of the second frequency band, and
   wherein if the second length is shorter than the first length, the control channel of the first frequency band schedules a data channel within a specific number of contiguous or discontinuous transmission units among a plurality of transmission units of the control channel of the second length corresponding to the transmission unit of the control channel of the first length.

2. The method of claim 1, wherein when the transmission unit of the different control channel is configured per each of the multiple frequency bands, the method further comprises detecting a control channel of a second frequency band scheduling a data channel of a first frequency band within a specific time.

3. The method of claim 1, further comprising receiving information on whether or not a control channel for a data channel of remaining transmission units except the specific number of contiguous or discontinuous transmission units among the plurality of the transmission units of the control channel of the second length is transmitted on the second frequency band or information on a resource region in which the control channel for the data channel of the remaining transmission units is to be detected.

4. The method of claim 1, wherein when the transmission unit of the different control channel is configured per each of the multiple frequency bands, the method further comprises receiving information on a candidate frequency band on which a candidate control channel for scheduling a data channel within a specific frequency band is transmitted.

5. The method of claim 4, further comprising receiving information on a resource region in which a plurality of candidate control channels are detected.

6. The method of claim 1, wherein when the transmission unit of the different control channel is configured per each of the multiple frequency bands, the method further comprises receiving information on a candidate frequency band to be scheduled by a control channel within a specific frequency band.

7. The method of claim 1, wherein when the transmission unit of the different control channel is configured per each of the multiple frequency bands, a hybrid automatic retransmission request-acknowledgement (HARQ-ACK) feedback for a specific data channel received within a specific frequency band is transmitted on the specific frequency band.

8. The method of claim 7, wherein a resource within the specific frequency band is determined by a control channel element (CCE) in which a control channel that schedules the specific data channel is received or is indicated by information transmitted via the control channel that schedules the specific data channel.

9. The method of claim 7, the HARQ-ACK feedback for a data channel which is received in a transmission unit n within a first frequency band having a transmission unit of a control channel of a first length is configured to be transmitted in a part of a plurality of transmission units within a second frequency band having a transmission unit of a control channel of a second length which is shorter than the first length corresponding to the transmission unit n.

10. The method of claim 1, wherein when the transmission unit of the different control channel is configured per each of the multiple frequency bands, the transmission unit is configured to a specific transmission unit within a part of the multiple frequency bands in which a common search space for a control channel for the terminal is configured and/or within a part of frequency bands in which the common search space is configured.

11. The method of claim 1, wherein when the transmission unit of the different control channel is configured per each of the multiple frequency bands, an aggregation level candidate configuration and/or a number of a blind decoding per aggregation level for performing the blind decoding in a specific search space for a control channel for the terminal is configured per each frequency band.

12. The method of claim 1, wherein when the transmission unit of the different control channel is configured per each of the multiple frequency bands, information on whether scheduling is performed on a self-frequency band or on a different frequency band per each of the multiple frequency bands.

13. A terminal configured to operate on multiple frequency bands in a wireless communication system, comprising:
a transmitter and a receiver; and
a processor that controls the transmitter and the receiver,
wherein the processor is further configured to:
receive information on a transmission unit of a control channel transmitted on each of the multiple frequency bands, wherein a subcarrier spacing for each of the multiple frequency bands is adaptively adjusted, and
detect the control channel on each of the multiple frequency bands based on the information,
wherein when a transmission unit of a different control channel is configured per each of the multiple frequency bands, a control channel of a first frequency band having a transmission unit of a control channel of a first length schedules a data channel of a second frequency band having a transmission unit of a control channel of a second length, and
wherein if the second length is longer than the first length, a time period of the control channel of the first frequency band is equal to or shorter than a time period of the control channel of the second frequency band, and
wherein if the second length is shorter than the first length, the control channel of the first frequency band schedules a data channel within a specific number of contiguous or discontinuous transmission units among a plurality of transmission units of the control channel of the second length corresponding to the transmission unit of the control channel of the first length.

* * * * *